United States Patent
Nishizaki et al.

(10) Patent No.: US 6,308,122 B1
(45) Date of Patent: Oct. 23, 2001

(54) STEERING SYSTEM FOR MOTOR VEHICLE

(75) Inventors: Katsutoshi Nishizaki, Nabari; Takanobu Takamatsu, Habikino; Masaya Segawa, Tenri, all of (JP)

(73) Assignees: Koyo Seiko Co., Ltd; Sumitomo Electric Industries, Ltd., both of Osaka (JP)

( * ) Notice: Subject to any disclaimer, the term of this patent is extended or adjusted under 35 U.S.C. 154(b) by 0 days.

(21) Appl. No.: 09/557,209

(22) Filed: Apr. 25, 2000

(30) Foreign Application Priority Data

May 11, 1999 (JP) .................................................. 11-130272

(51) Int. Cl.$^7$ ...................................................... B62D 5/04
(52) U.S. Cl. ................................. 701/41; 701/42; 180/410
(58) Field of Search ................................ 701/41, 42, 43, 701/44; 180/410, 443, 446

(56) References Cited

U.S. PATENT DOCUMENTS

| | | |
|---|---|---|
| 5,908,457 | 6/1999 | Higashira et al. |
| 6,148,948 * | 11/2000 | Shimizu et al. ........................ 701/41 |
| 6,152,255 * | 11/2000 | Noro et al. ............................. 701/41 |
| 6,240,349 * | 5/2001 | Nishimoto et al. .................... 701/41 |
| 6,240,350 * | 5/2001 | End ....................................... 180/446 |

FOREIGN PATENT DOCUMENTS

363226706 * 9/1998 (JP) ....................................... 701/41

* cited by examiner

Primary Examiner—Richard M. Camby
(74) Attorney, Agent, or Firm—Rabin & Berdo, P.C.

(57) ABSTRACT

Motor vehicle steering system for driving a steering mechanism on the basis of an operation angle of an operation mechanism. The system includes: a behavioral variable computation section for performing computation on a behavioral variable indicative of a behavior of a motor vehicle; and a steering angle controlling section for sequentially updating a relationship between a steering angle of vehicle wheels and the operation angle of the operation mechanism on the basis of a value of the behavioral variable computed by the behavioral variable computation section and a preset target value of the behavioral variable and controlling the steering mechanism on the basis of the updated relationship. The behavioral variable may be a steady-state gain which is a steady-state ratio of the steering angle of the vehicle wheels to the operation angle of the operation mechanism. The behavioral variable may be a time constant indicative of a responsiveness of a change in the steering angle of the vehicle wheels to a change in the operation angle of the operation mechanism.

16 Claims, 3 Drawing Sheets

VEHICLE TRAVELING PATH

YAW ANGLE

TIME

STEERING WHEEL OPERATION ANGLE

TIME

STEERING SYSTEM FOR MOTOR VEHICLE

BACKGROUND OF THE INVENTION

1. Field of the Invention

The present invention relates to a steering system for a motor vehicle, which is capable of variably setting a relationship between the steering of steerable vehicle wheels and the operation of an operation mechanism such as a steering wheel.

2. Description of Related Art

A steering system for a motor vehicle has been proposed in which a steering wheel is mechanically disengaged from a steering mechanism for steering vehicle wheels (see, for example, U.S. Pat. No. 5,908,457). This system is adapted to detect the direction and amount of the operation of the steering wheel and apply a driving force from an actuator such as an electric motor to the steering mechanism on the basis of the results of the detection.

This arrangement obviates the need for mechanical coupling between the steering mechanism and the steering wheel, so that upward thrust of the steering wheel can be prevented at collision of the motor vehicle. Further, this arrangement allows for structural simplification and weight reduction of the steering mechanism, and more flexible placement of the steering wheel. Moreover, this arrangement makes it possible to employ other operation mechanisms such as a steering lever and a steering pedal instead of the steering wheel.

In such a motor vehicle steering system, a relationship between the operation of the steering wheel and the operation of the steering mechanism can flexibly be changed through an electrical control. Thus, the maneuverability of the motor vehicle is expected to be drastically improved.

In the case of an ordinary motor vehicle in which a steering wheel and a steering mechanism are mechanically coupled to each other, for example, the dynamic characteristics of the motor vehicle responsive to the steering (over-steering, under-steering, neutral-steering and the like) are virtually determined by various factors (weight, wheel base, gravity center and the like) of the motor vehicle. The motor vehicle is generally designed so as to be driven in a slightly under-steered state.

However, the dynamic characteristics of the motor vehicle vary depending upon the number of passengers and a load on the motor vehicle. As the total weight of the motor vehicle increases, the tendency toward the under-steering generally increases to reduce the steering response of the motor vehicle. That is, the motor vehicle is less easy to corner.

Further, the dynamic characteristics vary from one motor vehicle to another. Therefore, a driver is often confused when driving a motor vehicle other than his familiar motor vehicle, and it takes some time for him to become accustomed to the driving of the motor vehicle.

SUMMARY OF THE INVENTION

It is a general object of the present invention to provide a steering system for a motor vehicle which is capable of effecting a proper behavioral change of the motor vehicle in response to a steering operation.

It is a specific object of the invention to provide a steering system for a motor vehicle which is capable of effecting a predetermined behavioral change of the motor vehicle in response to a steering operation.

It is another specific object of the invention to provide a steering system for a motor vehicle which is capable of stabilizing the behavior of the motor vehicle at cornering by complementing the driving skill of a driver.

It is further another specific object of the invention to provide a steering system for a motor vehicle which allows a motor vehicle to have dynamic characteristics according to a driver's preference.

In accordance with one aspect of the invention, there is provided a steering system for a motor vehicle, which comprises: a behavioral variable computation section for performing computation on a predetermined behavioral variable indicative of a behavior of the motor vehicle; and a steering angle controlling section for sequentially updating a relationship between a steering angle of vehicle wheels and an operation angle of an operation mechanism on the basis of a value of the behavioral variable computed by the behavioral variable computation section and a preset target value of the behavioral variable, and controlling a steering mechanism on the basis of the updated relationship.

The behavioral variable may include, for example, a steady-state gain which is a steady-state ratio of the steering angle (actual steering angle) of the vehicle wheels to the operation angle. The steady-state gain can be determined on the basis of the operation angle and a lateral acceleration.

The behavioral variable may include a time constant indicative of a followability (responsiveness) of a change in the steering angle of the vehicle wheels to a change in the operation angle. The time constant can be determined by detecting a phase difference between the operation angle and the steering angle of the steering mechanism.

The steering angle controlling section is preferably adapted to update the relationship between the steering angle of the vehicle wheels and the operation angle of the operation mechanism to minimize a difference between the value of the behavioral variable indicative of an actual behavior of the motor vehicle and the target value of the behavioral variable.

In accordance with the present invention, the update of the relationship between the steering angle of the vehicle wheels and the operation angle of the operation mechanism allows the motor vehicle to behave in accordance with the target value of the behavioral variable. Thus, any motor vehicle incorporating the steering system can have constant dynamic characteristics, so that a driver becomes accustomed to the dynamic characteristics of the motor vehicle from the beginning even if that motor vehicle is not his familiar motor vehicle.

In accordance with another aspect of the invention, there is provided a steering system for a motor vehicle, which comprises: a steering correction amount detecting section for detecting a correction amount of a steering operation at cornering; and a steering controlling section for updating a relationship between a steering control of vehicle wheels and an operation amount of an operation mechanism on the basis of the correction amount of the steering operation detected by the steering correction amount detecting section, and controlling a steering mechanism on the basis of the updated relationship.

The correction amount of the steering operation can be determined, for example, by detecting the operation amount of the operation mechanism by means of an operation amount detecting section (e.g., operation angle detector such as rotary encoder) and calculating an overshoot occurring before the operation amount is restored to a steady-state level after the cornering. The relationship between the steering control of the vehicle wheels and the operation amount may be updated on condition that the overshoot in an operation amount change exceeds a predetermined level.

The correction amount of the steering operation may be determined, for example, by calculating an overshoot occurring before a yaw angle change of the motor vehicle or a lateral positional offset of the motor vehicle (a positional offset with respect to a direction perpendicular to a traveling direction of the motor vehicle, i.e., a widthwise positional offset of the motor vehicle) is restored to a steady-state level after the cornering. The relationship between the steering control of the vehicle wheels and the operation amount may be updated on condition that the overshoot in the yaw angle change or the lateral positional offset of the motor vehicle exceeds a predetermined level.

A driver unskilled in driving tends to return a steering wheel with a time delay at the final stage of the cornering at an intersection. Therefore, the driver has to correct the steering operation, so that the motor vehicle is laterally staggered. In the invention, the control of the steering mechanism is properly varied according to the correction amount of the steering operation, whereby smooth cornering is ensured to stabilize the behavior of the motor vehicle irrespective of the driving skill of the driver.

In accordance with further another aspect of the invention, there is provided a steering system for a motor vehicle, which comprises: a dynamic characteristic setting section for setting a dynamic characteristic of the motor vehicle by manually setting a relationship between a steering angle of vehicle wheels and an operation angle of an operation mechanism; and a steering angle controlling section for controlling a steering mechanism on the basis of the dynamic characteristic set by the dynamic characteristic setting section and the operation angle of the operation mechanism.

The dynamic characteristic setting section may variably set a so-called stability factor.

With this arrangement, the dynamic characteristic of the motor vehicle can manually be set, so that a driver can variably set the dynamic characteristic of the motor vehicle in accordance with a driver's preference. Thus, even when a driver drives a motor vehicle other than his familiar motor vehicle, he becomes accustomed to the driving of the motor vehicle from the beginning.

The foregoing and other objects, features and effects of the present invention will become more apparent from the following description of the preferred embodiments with reference to the attached drawings.

DESCRIPTION OF THE PREFERRED EMBODIMENTS

Figure 1:
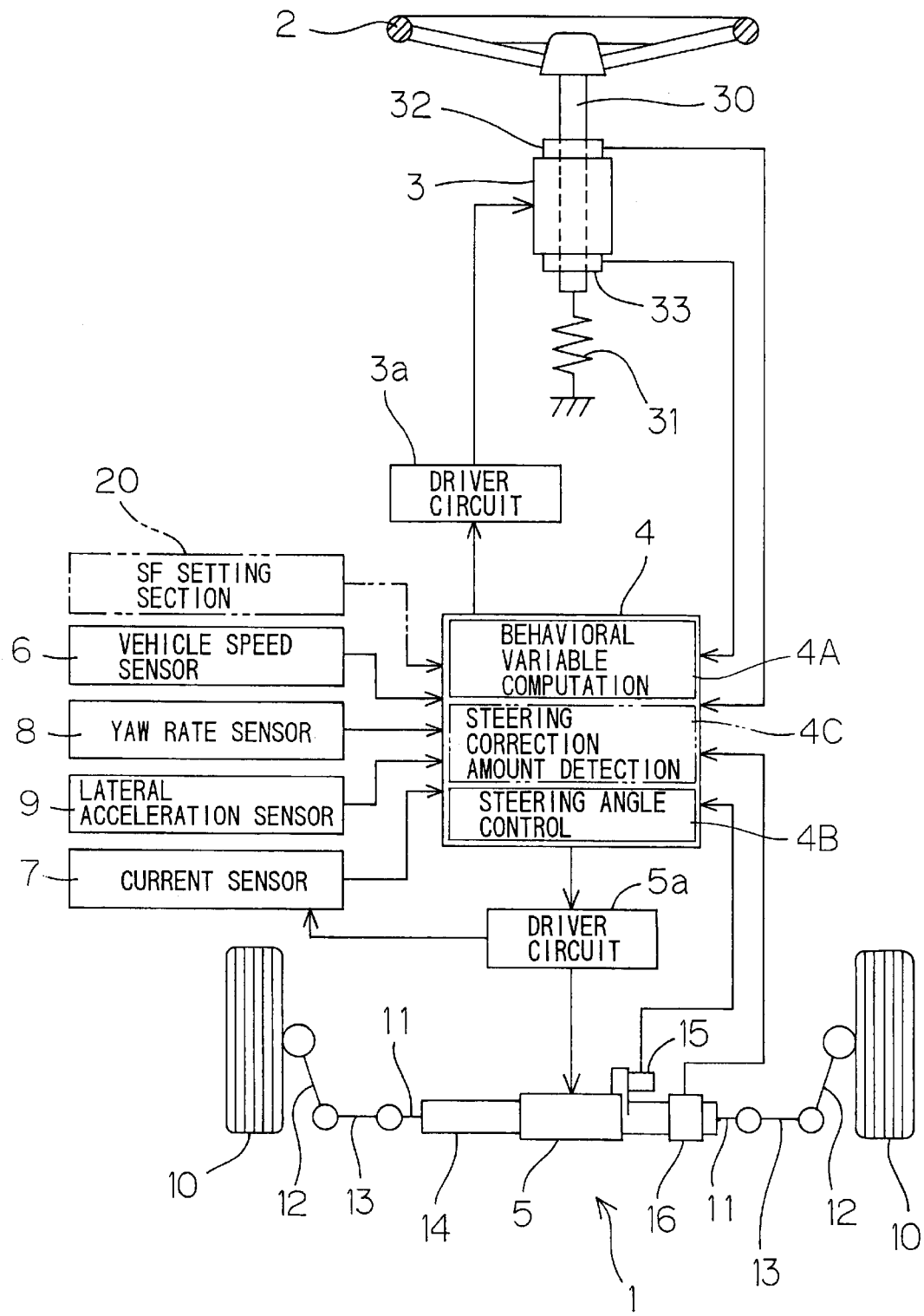
FIG. 1 is a conceptual diagram illustrating the construction of a steering system for a motor vehicle in accordance with one embodiment of the present invention.

FIG. 1 is a conceptual diagram illustrating the construction of a steering system for a motor vehicle in accordance with one embodiment of the present invention. The steering system has a steering mechanism 1 for steering a pair of steerable vehicle wheels (typically front wheels) 10, 10, a steering wheel 2 provided as an operation mechanism with no mechanical engagement with the steering mechanism 1, a reaction force actuator 3 for applying a reaction force to the steering wheel 2, and a steering controller 4 including a microprocessor and the like. The steering controller 4 drives a steering motor 5 provided as a steering actuator associated with the steering mechanism 1 in accordance with the operation of the steering wheel 2 to operate the steering mechanism 1.

The steering mechanism 1 has a steering shaft 11 extending transversely of a body of the motor vehicle and slidable longitudinally thereof, and knuckle arms 12, 12 respectively coupled to opposite ends of the steering shaft 11 via tie rods 13, 13 and supporting the wheels 10, 10. The steering shaft 11 is supported within a housing 14 so as to be axially slidable. The steering motor 5 is provided coaxially with the steering shaft 11 at the midportion of the steering shaft 11. The steering of the wheels 10 is achieved by converting the rotation of the steering motor 5 into the sliding movement of the steering shaft 11 by a movement conversion mechanism such as comprised of a ball thread. Examples of the steering motor 5 and the movement conversion mechanism are disclosed in U.S. Pat. No. 5,908,457, the disclosure of which is incorporated herein by reference in its entirety.

A rotary encoder 15 for detecting the rotational angular position of the steering motor 5 is provided in association with the steering motor 5. A steering angle sensor 16 for detecting a steering angle of the wheels 10 by detecting the axial position of the steering shaft 11 is provided in association with the steering shaft 11. Output signals of the rotary encoder 15 and the steering sensor 16 are inputted to the steering controller 4.

The reaction force actuator 3 is comprised of an electric motor (e.g., three-phase blushless motor) having a rotary shaft 30 projecting to opposite sides thereof, and its casing is fixed to an appropriate position of the vehicle body. The steering wheel 2 is fixed to one projecting end of the rotary shaft 30 coaxially with the rotary shaft 30. The other projecting end of the rotary shaft 30 is coupled to an appropriate portion of the vehicle body via a torsion spring 31 having a predetermined elasticity.

The reaction force actuator 3 is energized by a driver circuit 3a in response to an operation command signal applied from the steering controller 4 to generate a torque in the normal and reverse directions. Thus, the reaction force actuator 3 applies a reaction force to the steering wheel 2 in a direction opposite to the direction of the operation of the steering wheel 2. When the steering wheel 2 is turned, a steering torque should be applied against the reaction force generated by the reaction force actuator 3. The steering torque is detected by a torque sensor 32 provided in conjunction with the reaction force actuator 3. The amount and direction of the operation of the steering wheel 2 are detected by a rotary encoder 33 (operation angle detecting section) provided on the reaction force actuator 3. The detection results given by the torque sensor 32 and the rotary encoder 33 are applied to the steering controller 4.

The torsion spring 31 is operative to return the steering wheel 2 to a predetermined neutral position by rotating the rotary shaft 30 by its elasticity when a driver stops rotating the steering wheel. Thus, the steering wheel 2 can be returned to the neutral position, while the wheels 10, 10 are turned back to a straight traveling direction.

The steering controller 4 is connected to a current sensor 7 for detecting an electric current flowing through the steering motor 5, a vehicle speed sensor 6 for detecting a vehicle speed, a yaw rate sensor 8 (e.g., gyro) for detecting a vehicle yaw rate, and a lateral acceleration sensor 9 for detecting a vehicle lateral acceleration.

In this embodiment, the steering controller 4 functionally has a behavioral variable computation section 4A, in which a behavioral characteristic (yaw rate, lateral acceleration or the like) of the motor vehicle with respect to the operation of the steering wheel 2 is constantly computed during the traveling of the motor vehicle. The steering controller 4 further functionally has a steering angle control section 4B which controls the steering motor 5 via a driver circuit 5a so as to minimize a difference between an actual behavioral characteristic and a predetermined target behavioral characteristic of the motor vehicle. More specifically, a relationship between an actual steering angle $\delta_f$ of the wheels 10 (detected by the steering angle sensor 16) and a steering wheel operation angle $\delta_h$ (detected by the rotary encoder 33) which corresponds to the amount of the operation of the steering wheel 2 is sequentially updated on the basis of the result of a comparison between the actual vehicle behavioral characteristic and the target vehicle behavioral characteristic.

In general, a dynamic characteristic (which is herein a yaw rate) of the motor vehicle with respect to the steering wheel operation angle $\delta_h$ is represented by the following equation (1):

$$\gamma(s)/\delta_h(s) = G_\gamma(1+T_\gamma s)/(1+2\xi s/\omega_n + s^2/\omega_n^2) \quad (1)$$

wherein $\gamma$ is the yaw rate; $G_\gamma$ is a steady-state gain which equals to $V/(1+SF \cdot V^2)WB$; $T_\gamma$ is a time constant which equals to $ml_f V/2WB \cdot K_r$; $\omega_n$ is the characteristic frequency of the motor vehicle; $\xi$ is the damping ratio of the motor vehicle; s is the Laplace operator; m is the mass of the motor vehicle; $K_r$ is a cornering power applied to each rear wheel; $l_f$ is a distance between the gravity center and the respective front wheels; SF is a stability factor; WB is a wheel base; and V is a vehicle speed.

In an ordinary steering system in which a steering wheel is mechanically disengaged from a steering mechanism, a target steering angle $\delta_f^*$ of vehicle wheels is generally determined, for example, on the basis of the following equation (2) by setting a steady-state gain of a steering angle $\delta_f$ of the vehicle wheels with respect to a steering wheel operation angle $\delta_h$ in accordance with a vehicle speed (or a gear ratio responsive to the vehicle speed).

$$\delta_f^* = N(V) \cdot \delta_h \quad (2)$$

wherein N(V) is the gear ratio responsive to the vehicle speed.

In this embodiment, however, the target steering angle $\delta_f^*$ is determined on the basis of the following equation (3):

$$\delta_f^* = N(V) \cdot (K_p + K_d s) \cdot \delta_h \quad (3)$$

where in $K_p$ is a proportional parameter; $K_d$ is a differential parameter; and s is the Laplace operator.

The steering controller 4 constantly computes the difference between the target vehicle behavioral characteristic and the actual vehicle behavioral characteristic during the traveling, and the proportional parameter $K_p$ and the differential parameter $K_d$ are sequentially set to optimum levels.

More specifically, the steering controller 4 constantly computes the steady-state gain $G_\gamma$ and the time constant $T_\gamma$ during the traveling. Then, a differential $\Delta G_\gamma$ between the actual steady-state gain $G_\gamma$ and a predetermined target steady-state gain $G_\gamma^*$ and a differential $\Delta T_\gamma$ between the actual time constant $T_\gamma$ and a predetermined target time constant $T_\gamma^*$ are determined as follows:

$$\Delta G_\gamma = G_\gamma - G_\gamma^* \quad (4)$$

$$\Delta T_\gamma = T_\gamma - T_\gamma^* \quad (5)$$

The differential $\Delta G_\gamma$ in the steady-state gain corresponds to a difference between the actual vehicle behavioral characteristic and a static vehicle behavioral characteristic to be targeted. Therefore, the proportional parameter $K_p$ is variably set on the basis of the differential $\Delta G_\gamma$ in the steady-state gain so as to minimize the differential $\Delta G_\gamma$. More specifically, if the differential $\Delta G_\gamma$ is negative, the proportional parameter $K_p$ is increased by a predetermined minimum increment (e.g., about 0.05) and, when the differential $\Delta G_\gamma$ exceeds zero, the setting of the parameter $K_p$ is completed. In this case, the stability factor SF and the like may be preliminarily set so that the initial value of the steady-state gain $G_\gamma$ is smaller than the target steady-state gain $G_\gamma^*$.

On the other hand, the time constant $T_\gamma$ corresponds to a response speed of the motor vehicle, i.e., a dynamic vehicle characteristic of the motor vehicle. The differential parameter $K_d$ is variably set on the basis of the differential $\Delta T_\gamma$ in the time constant $T_\gamma$ so as to minimize the differential $\Delta T_\gamma$. More specifically, if the differential $\Delta T_\gamma$ is negative which means that the response is faster than a target level, the differential parameter $K_d$ is reduced by a predetermined minimum decrement (e.g., about 0.01) so that the response is slowed down. Therefore, the initial value of the time constant $T_\gamma$ may be adapted to be smaller than the target time constant $T_\gamma^*$ and, when the differential $\Delta T_\gamma$ exceeds zero, the setting of the parameter $K_d$ may be completed.

Figure 2:
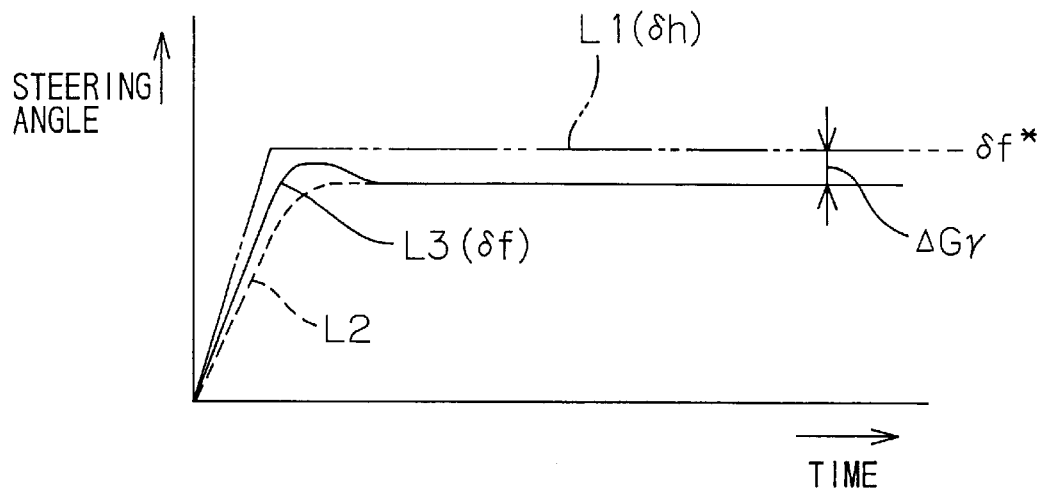
FIG. 2 is a graph showing, by way of example, a change in an actual steering angle with time.

FIG. 2 is a graph showing, by way of example, a change in the steering angle $\delta_f$ with time. It is herein assumed that a stepwise steering operation is performed to change the steering wheel operation angle $\delta_h$ as indicated by a line L1. In the case of an ordinary control as performed in accordance with the above equation (2), the steering angle $\delta_f$ changes as indicated by a line L2. In the case of the control of this embodiment as performed in accordance with the above equation (3), the starting characteristic is improved as indicated by a line L3 by an effect of the differential term (the term of s).

The differential $\Delta G_\gamma$ in the steady-state gain is determined by a difference between the actual steering angle $\delta_f$ and the target steering angle $\delta_f^*$ for the steering wheel operation angle $\delta_h$. On the other hand, the following expressions are satisfied:

$$\delta_f \gamma/G_\gamma \quad (6)$$

$$\delta_f^* \gamma^*/G_\gamma^* \quad (7)$$

Therefore, the differential $\Delta G_\gamma$ in the steady-state gain can be calculated on the basis of the differential $\Delta \delta_f (= \delta_f - \delta_f^*)$ between the actual steering angle $\delta_f$ and the target steering angle $\delta_f^*$.

On the other hand, the differential $\Delta T_\gamma$ in the time constant $T_\gamma$ can be determined on the basis of a time difference between a target yaw rate $\gamma^*$ for a change in the steering wheel operation angle $\delta_h$ and an actual yaw rate $\gamma$ (detected by the yaw rate sensor 8).

Figure 3:
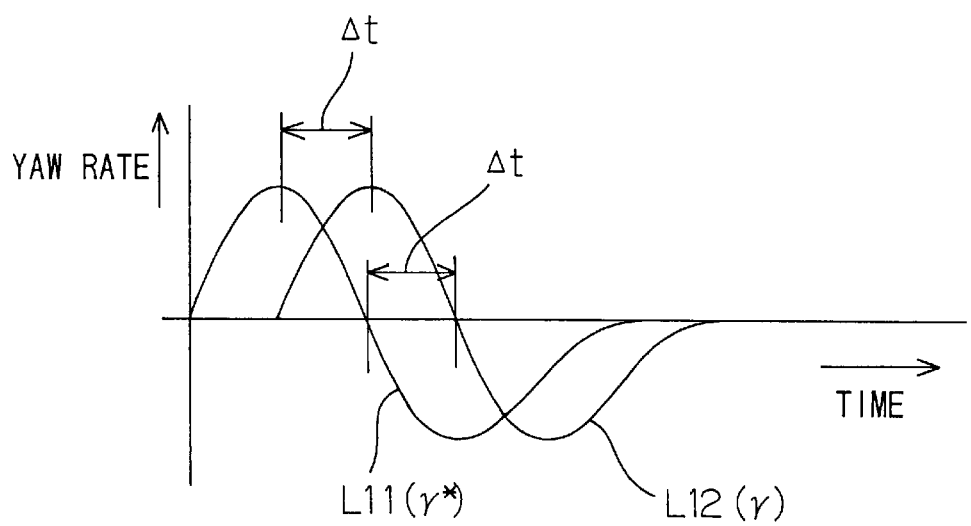
FIG. 3 is a graph showing, by way of example, changes in a target yaw rate and an actual yaw rate with time.

When the target yaw rate $\gamma^*$ is set in accordance with the change in the steering wheel operation angle $\delta_h$, a time difference $\Delta t$ between a point on a line L11 indicative of the change in the target yaw rate $\gamma^*$ and a point on a line L12 indicative of a change in the actual yaw rate $\gamma$ which are located at the same phase position (e.g., peak points or zero-cross points) is detected (see FIG. 3). The time difference $\Delta t$ corresponds to the differential $\Delta T_\gamma$ in the time constant.

In accordance with this embodiment, the actual vehicle behavioral characteristic is constantly computed, and the proportional parameter $K_p$ and the differential parameter $K_d$ are variably set so as to minimize the difference between the actual behavioral characteristic and the target behavioral characteristic. Thus, the steady-state gain $G_\gamma$ of the steering angle $\delta_\gamma$ and the time constant $T_\gamma$ (response characteristic) for the steering wheel operation angle $\delta_h$ can automatically be led to target levels.

In this way, a constant dynamic characteristic can be ensured for any motor vehicle incorporating the steering system. Therefore, a driver can easily be accustomed to the motor vehicle to enjoy smooth driving from the beginning. Where the proportional parameter $K_p$ and the differential parameter $K_d$ are calculated by employing the previous values thereof as initial values every time the engine of the motor vehicle is started, the aging of the respective components of the motor vehicle can be compensated for, so that the motor vehicle can maintain satisfactory dynamic characteristics over almost the entire service life of the motor vehicle.

Referring again to FIG. 1, an explanation will be given to a second embodiment of the invention. In this embodiment, the target steering angle $\delta_f^*$ is determined from the above equation (3) as in the first embodiment, and the steering controller 4 controls the steering motor on the basis of the target steering angle $\delta_f^*$.

In this embodiment, the proportional parameter $K_p$ and the differential parameter $K_d$ are automatically adjusted to complement the driving skill of an unskilled driver to allow for ideal cornering.

More specifically, as indicated by a two-dot-and-dash line in FIG. 1, the steering controller 4 functionally has a steering correction amount detection section 4C, in which an overshoot occurring before a yaw angle change or a lateral positional change of the motor vehicle is restored to a steady-state level at the cornering and an overshoot of the steering wheel operation angle $\delta_h$ at the cornering are computed. The yaw angle change is determined by integrating the yaw rate detected by the yaw rate sensor 8. The lateral positional change is determined by integrating twice the lateral acceleration detected by the lateral acceleration sensor 9. The steering wheel operation angle $\delta_h$ is detected on the basis of the output of the rotary encoder 33.

Figure 4:
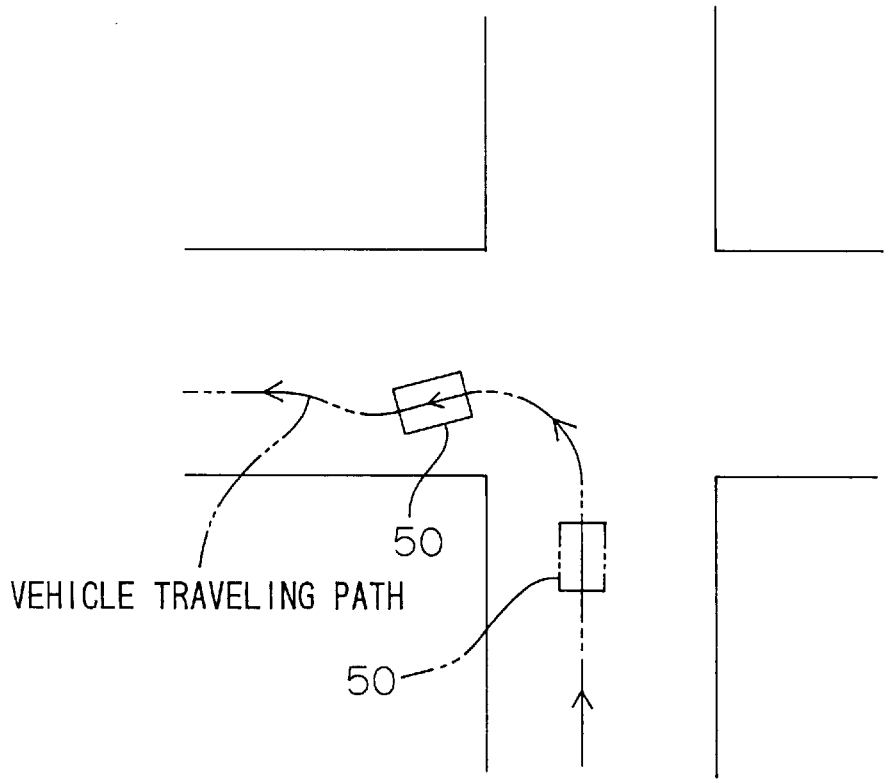
FIG. 4 is a schematic diagram illustrating an exemplary traveling path of a motor vehicle driven by an unskilled driver who requires a correction in his steering operation.

The unskilled driver tends to operate the steering wheel with a time delay. At the cornering at an intersection, the driver tends to return the steering wheel with a time delay so that he has to perform a corrective steering operation opposite to the direction of the cornering. Therefore, the motor vehicle 50 staggers at the final stage of the cornering as shown in FIG. 4. Before the orientation (yaw angle) and lateral position of the motor vehicle 50 are stabilized in a predetermined steady state, the driver has to perform the corrective steering operation several times.

Figure 5A:
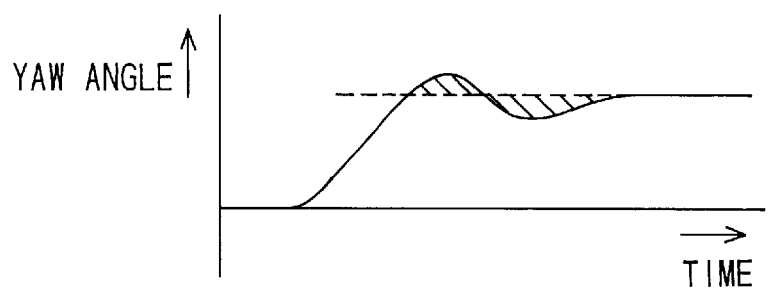
FIGS. 5A and 5B are graphs respectively showing a time-related change in a yaw angle and a time-related change in a steering wheel operation angle observed at cornering of the motor vehicle driven by the unskilled driver.
Figure 5B:
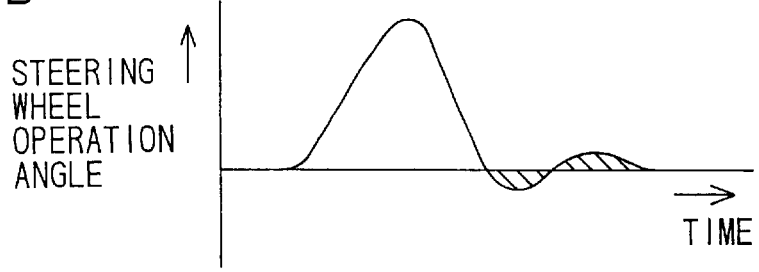

In this case, the yaw angle and the steering wheel operation angle vary with time as shown in FIGS. 5A and 5B, in which hatched portions correspond to the overshoots. Although the overshoots are zero for the ideal cornering, the cornering by the unskilled driver entails greater overshoots.

In this embodiment, if the following conditions (i) and (ii) are satisfied, the proportional parameter $K_p$ and the differential parameter $K_d$ are each increased by a predetermined minimum increment (e.g., about 0.05 for $K_p$ and about 0.01 for $K_d$) for update thereof. Thus, the overshoots are minimized.

(i) The overshoot in the yaw angle change (or the lateral positional change) exceeds a predetermined threshold.

(ii) The overshoot of the steering wheel operation angle exceeds a predetermined threshold.

As can be understood from FIGS. 5A and 5B, the overshoot in the yaw angle change (or the lateral positional change) and the overshoot of the steering wheel operation angle can be determined by the integration of the yaw angle change (or the lateral positional change) and the steering wheel operation angle. The integration is performed by the steering controller 4. In this embodiment, the yaw rate sensor 8 or the lateral acceleration sensor 9, the rotary encoder 33 and the steering controller 4 constitute a steering correction amount detecting section.

By increasing the proportional parameter $K_p$, the steady-state gain of the steering angle $\delta_f$ for the steering wheel operation angle $\delta_h$ is increased. By increasing the differential parameter $K_d$, the response of the steering angle change to the operation of the steering wheel becomes faster. Thus, the delay of the steering operation performed by the unskilled driver can be compensated for to ensure smooth cornering behavior of the motor vehicle. In addition, the proportional and differential parameters $K_p$ and $K_d$ are variably set by actually determining the overshoots, so that the compensation for the response delay can be made in accordance with the driving skill and unique driving characteristic of the driver. Therefore, any driver can assuredly achieve a predetermined vehicle cornering performance.

This embodiment may be applied to a power steering system which is constructed such that a steering wheel is mechanically coupled to a steering mechanism, for example, by a rack and pinion structure for application of a steering assist force to the steering mechanism.

For example, a target assist torque (a target steering assist) for a steering torque applied to the steering wheel is calculated from the following equation (8):

$$Ta^* = (K_p + K_d s) \cdot T_h \tag{8}$$

wherein Ta* is the target assist torque; $T_h$ is the steering torque; and s is the Laplace operator.

The proportional parameter $K_p$ and the differential parameter $K_d$ are sequentially adjusted in the same manner as in the aforesaid embodiment.

Thus, the delay of the steering operation is compensated for, so that the same effect as in the aforesaid embodiment can be achieved.

Where the steering system is constructed such that the steering wheel is mechanically disengaged from the steering mechanism, the steering mechanism 1 is controlled in accordance with the above equation (3) and, in addition, the torque to be generated by the reaction force actuator is preferably controlled in accordance with the above equation (8).

Referring again to FIG. 1, an explanation will be given to a third embodiment of the present invention. Although the dynamic characteristics of the motor vehicle are automatically changed in the first and second embodiments, the dynamic characteristics of the motor vehicle can be set according to a driver's preference by operating a stability factor (SF) setting section 20 (dynamic characteristic setting section) connected to the steering controller 4 as indicated by a two-dot-and-dash line in FIG. 1 in the third embodiment. The stability factor setting section 20 may comprise a volume [a control dial or a sliding lever] or a switch provided in a position accessible by a driver.

In an ordinary yaw rate control by the steering angle control, the target yaw rate γ* for the steering torque T or the steering wheel operation angle $δ_h$ is a fixed value which is preliminarily determined on the basis of various vehicle designing factors.

In this embodiment, however, the steering controller 4 calculates the target yaw rate γ* from the following equation (9), and performs a yaw rate control on the basis of the target yaw rate γ* thus calculated.

$$γ* = V/(1+SF*·V^2)WB \quad (9)$$

wherein V is a vehicle speed; SF* is a variable stability factor; and WB is a wheel base.

Since the target yaw rate γ* can variably be set by variably setting the stability factor SF* by means of the stability factor setting section 20, the yaw rate control can be performed according to the driver's preference. That is, a gain (ratio) of the yaw rate γ for the steering wheel operation angle $δ_h$ can be set according to the driver's preference.

Although the present invention has thus been described by way of the three embodiments thereof, the invention can be embodied in any other ways. For example, any other operation mechanisms such as a steering pedal and a steering lever may be employed instead of the steering wheel. Further, the vehicle steering system described above may be integrated with a vehicle yaw moment control system.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application claims priority benefits under the Convention on the basis of Japanese Patent Application No. 11-130272 filed to the Japanese Patent Office on May 11, 1999, the disclosure thereof being incorporated herein by reference.

What is claimed is:

1. A motor vehicle steering system for driving a steering mechanism on the basis of an operation angle of an operation mechanism, the motor vehicle steering system comprising:
   a behavioral variable computation section for performing computation on a predetermined behavioral variable indicative of a behavior of a motor vehicle; and
   a steering angle controlling section for sequentially updating a relationship between a steering angle of vehicle wheels and the operation angle of the operation mechanism on the basis of a value of the behavioral variable computed by the behavioral variable computation section and a preset target value of the behavioral variable, and controlling the steering mechanism on the basis of the updated relationship.

2. A motor vehicle steering system as set forth in claim 1, wherein the behavioral variable computation section determines a steady-state gain which is a steady-state ratio of the steering angle of the vehicle wheels to the operation angle of the operation mechanism.

3. A motor vehicle steering system as set forth in claim 1, wherein the behavioral variable computation section determines a time constant indicative of a responsiveness of a change in the steering angle of the vehicle wheels to a change in the operation angle of the operation mechanism.

4. A motor vehicle steering system as set forth in claim 1, wherein the steering angle controlling section updates the relationship between the steering angle of the vehicle wheels and the operation angle of the operation mechanism to minimize a difference between the value of the behavioral variable indicative of an actual behavior of the motor vehicle and the target value of the behavioral variable.

5. A motor vehicle steering system as set forth in claim 1, wherein the steering angle controlling section determines a target steering angle $δ_f*$ of the vehicle wheels on the basis of the operation angle $δ_h$, a proportional parameter $K_p$, a differential parameter $K_d$, and the Laplace operator s from the following equation:

$$δ_f* (K_p+K_d s)·δ_h,$$

and variably sets at least one of the proportional parameter $K_p$ and the differential parameter $K_d$ on the basis of a differential between the value of the behavioral variable and the preset target value of the behavioral variable.

6. A motor vehicle steering system as set forth in claim 5,
   wherein the behavioral variable computation section determines a steady-state gain which is a steady-state ratio of the steering angle of the vehicle wheels to the operation angle of the operation mechanism,
   wherein the steering angle controlling section variably sets the proportional parameter $K_p$ on the basis of a differential between the steady-state gain determined by the behavioral variable computation section and a target steady-state gain.

7. A motor vehicle steering system as set forth in claim 5,
   wherein the behavioral variable computation section determines a time constant indicative of a responsiveness of a change in the steering angle of the vehicle wheels to a change in the operation angle of the operation mechanism,
   wherein the steering angle controlling section variably sets the differential parameter $K_d$ on the basis of a differential between the time constant determined by the behavioral variable computation section and a target time constant.

8. A motor vehicle steering system for driving a steering mechanism on the basis of an operation angle of an operation mechanism, the motor vehicle steering system comprising:
   a steering correction amount detecting section for detecting a correction amount of a steering operation at cornering; and
   a steering controlling section for updating a relationship between a steering control of vehicle wheels and the operation amount of the operation mechanism on the basis of the correction amount of the steering operation detected by the steering correction amount detecting section, and controlling the steering mechanism on the basis of the updated relationship.

9. A motor vehicle steering system as set forth in claim 8, further comprising an operation amount detecting section for detecting the operation amount of the operation mechanism, wherein the steering correction amount detecting section calculates an overshoot occurring before the operation amount detected by the operation amount detecting section is restored to a steady-state level after the cornering.

10. A motor vehicle steering system as set forth in claim 9, wherein the steering controlling section updates the relationship between the steering control of the vehicle wheels and the operation amount on condition that the overshoot calculated by the steering correction amount detecting section exceeds a predetermined level.

11. A motor vehicle steering system as set forth in claim 8, wherein the steering correction amount detecting section calculates an overshoot occurring before a yaw angle change of a motor vehicle or a widthwise positional offset of the motor vehicle is restored to a steady-state level after the cornering.

12. A motor vehicle steering system as set forth in claim 11, wherein the steering controlling section updates the relationship between the steering control of the vehicle wheels and the operation amount on condition that the overshoot calculated by the steering correction amount detecting section exceeds a predetermined level.

13. A motor vehicle steering system as set forth in claim 8, wherein the steering controlling section determines a target steering angle $\delta_f^*$ of the vehicle wheels on the basis of the operation angle $\delta_h$, a proportional parameter $K_p$, a differential parameter $K_d$, and the Laplace operator s from the following equation:

$$\delta_f^* (K_p + K_d s) \cdot \delta_h,$$

and variably sets at least one of the proportional parameter $K_p$ and the differential parameter $K_d$ on the basis of the correction amount of the steering operation detected by the steering correction amount detecting section.

14. A motor vehicle steering system as set forth in claim 13, further comprising an operation angle detecting section for detecting the operation angle of the operation mechanism, wherein the steering correction amount detecting section calculates a first overshoot occurring before the operation angle detected by the operation angle detecting section is restored to a steady-state level after the cornering and a second overshoot occurring before a yaw angle change of a motor vehicle or a widthwise positional offset of the motor vehicle is restored to a steady-state level after the cornering, wherein the steering angle controlling section updates the proportional parameter $K_p$ and the differential parameter $K_d$ on condition that the first and second overshoots each exceed a predetermined threshold.

15. A motor vehicle steering system for driving a steering mechanism on the basis of an operation angle of an operation mechanism, the motor vehicle steering system comprising:

a dynamic characteristic setting section for setting a dynamic characteristic of a motor vehicle by manually setting a relationship between a steering angle of vehicle wheels and the operation angle of the operation mechanism; and a steering angle controlling section for controlling the steering mechanism on the basis of the dynamic characteristic set by the dynamic characteristic setting section and the operation angle of the operation mechanism.

16. A motor vehicle steering system as set forth in claim 15, wherein the dynamic characteristic setting section variably sets a stability factor.

* * * * *